W. T. DOREMUS.
Furniture Springs.

No. 140,189. Patented June 24, 1873.

Witnesses:

Inventor:
W. T. Doremus
Per
Attorneys.

UNITED STATES PATENT OFFICE.

WILLIAM T. DOREMUS, OF NEW YORK, N. Y.

IMPROVEMENT IN FURNITURE-SPRINGS.

Specification forming part of Letters Patent No. 140,189, dated June 24, 1873; application filed June 7, 1873.

*To all whom it may concern:*

Figure 1:
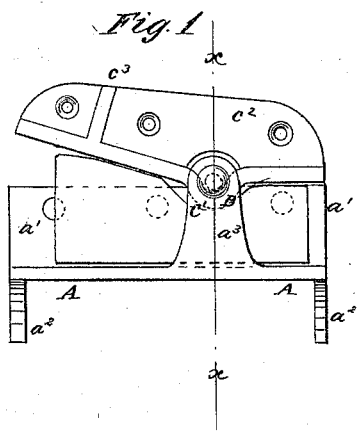
Figure 2:
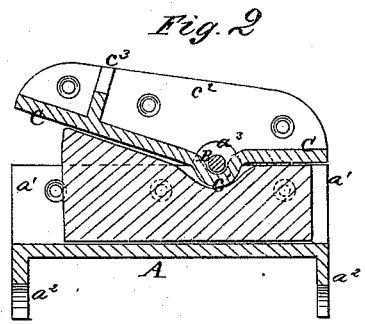
Figure 3:
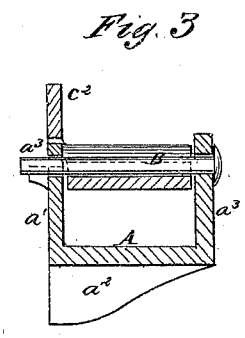

Be it known that I, WILLIAM T. DOREMUS, of the city, county and State of New York, have invented a new and useful Improvement in Furniture-Springs, of which the following is a specification:

Figure 1 is a side view of one of my improved springs. Fig. 2 is a longitudinal section of the same. Fig. 3 is a cross-section of the same taken through the line $x$ $x$, Fig. 1.

My invention has for its object to furnish an improved spring for connecting a seat-frame of a chair to the pedestal, for connecting the parts of a jointed back, and for application to any other parts of a chair or to a spring-bed, or other piece of furniture, where a yielding connection is required, and which shall at the same time be simple in construction, convenient in application, and reliable in use, being durable and not liable to get out of order. The invention consists in the combination of the plate provided with flanges and lugs, the plate provided with flanges and a depression, the bolt and the rubber block with each other, as hereinafter fully described.

A is a plate which is made with an upwardly-projecting flange $a'$ upon one of its side edges, in which are formed a number of holes to receive the screws or bolts by which it is secured in place. The plate A is also strengthened by cross-flanges $a^2$ upon the ends of its lower side. The flanges $a^2$ not only strengthen the plate A, but, by being let into the part of the chair to which the said plate A is attached, they hold the plate from moving, and thus greatly assist the bolts or screws in holding it and relieve them from strain. Upon the upper edge of the flange $a'$, and upon the edge of the plate A, are formed lugs $a^3$ to receive the bolt B that hinges the plate C. The plate C is made with a depression, $c'$, to receive the bolt B, as shown in Figs. 1, 2, and 3. The plate C is made with a flange, $c^2$, upon the upper side of one of its side edges, in which flange are formed a number of holes to receive the screws or bolts by which it is secured in place. The plate C is also made with one or more cross-flanges, $c^3$, to prevent it from slipping upon the part of the article to which it is secured, and thus relieve the screws or bolts from a portion of the strain. D is a rubber block, which is interposed between the plates A C, as shown in Figs. 1 and 2. The rubber block D may be made tapering or wedge-shaped, or rectangular, or of any other desired form, according to the kind of chair or other article to which it is applied, and should be made of such a size that the part beneath the axis of the hinge may be compressed more or less, according to the amount of elasticity required. The hinge may be located toward one end of the plates A C, as shown in the drawings, or in the center, or near one end, as the purpose for which the spring is to be used may require.

Having thus described my invention, I claim as new, and desire to secure by Letters Patent—

The combination of the plate A provided with the flanges $a^1$ $a^2$, and the lugs $a^3$, the plate C provided with flanges $c^2$ $c^3$, and the depression $c^1$, the bolt B, and the rubber block D, with each other, substantially as herein shown and described.

WILLIAM T. DOREMUS.

Witnesses:
 JAMES T. GRAHAM,
 T. B. MOSHER.